UNITED STATES PATENT OFFICE.

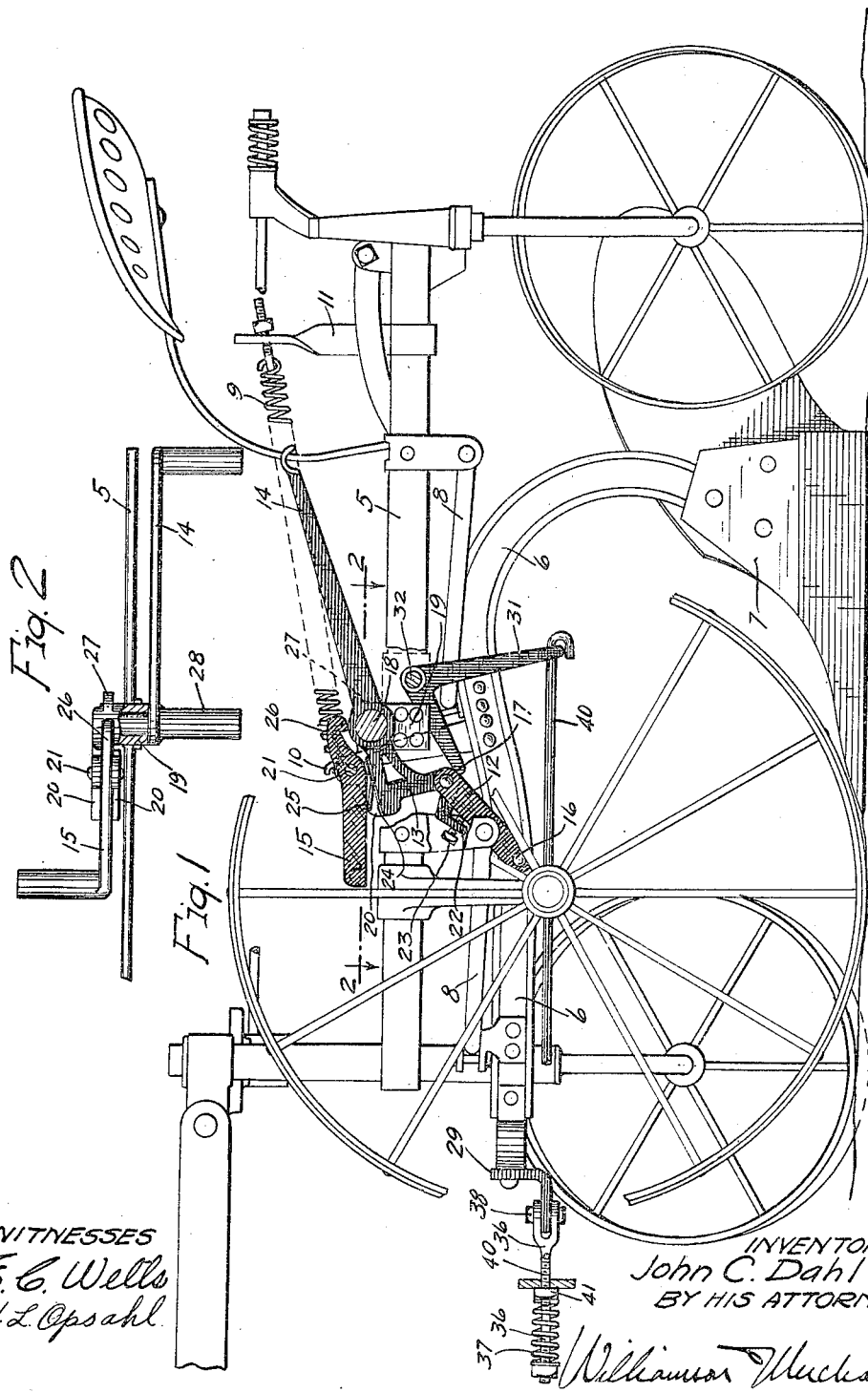

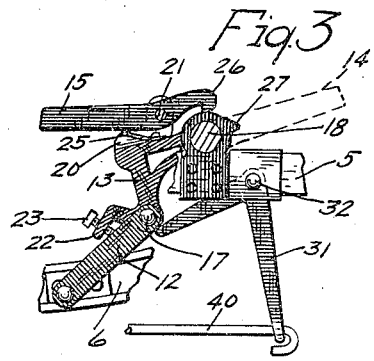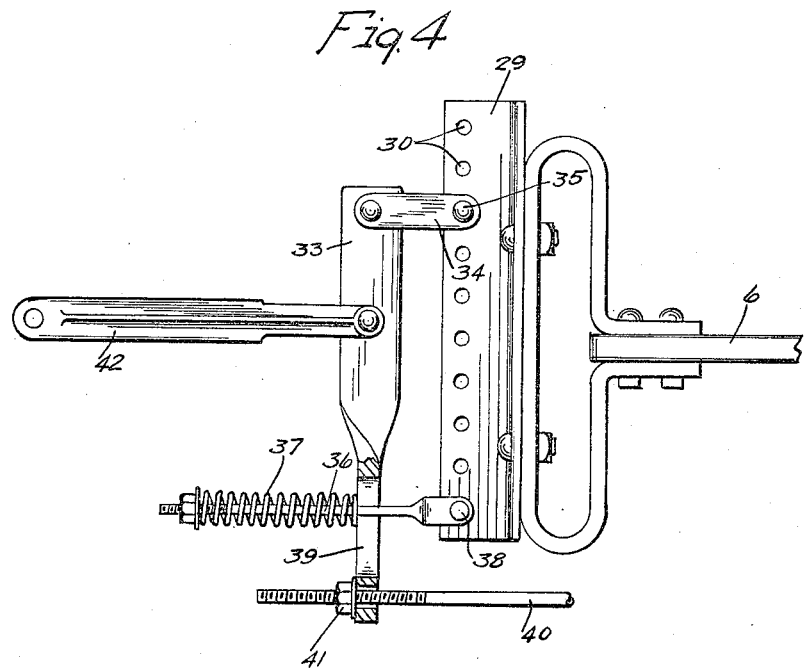

JOHN C. DAHL, OF PINE RIVER, MINNESOTA.

PLOW-TRIP.

1,295,127.  Specification of Letters Patent.  Patented Feb. 25, 1919.

Application filed October 20, 1917. Serial No. 197,728.

*To all whom it may concern:*

Be it known that I, JOHN C. DAHL, a citizen of the United States, residing at Pine River, in the county of Cass and State of Minnesota, have invented certain new and useful Improvements in Plow-Trips; and I do hereby declare the following to be a full, clear, and exact description of the invention, such as will enable others skilled in the art to which it appertains to make and use the same.

My invention relates to improvements in sulky or gang plows, of standard or other construction, wherein the plow beam is attached to the frame for lowering and raising movements to carry the plow proper into and out of the ground, and wherein foot mechanism is provided for imparting such movements to the plow beam, including means for positively holding the plow beam in its lowered position, and for rendering such means inoperative, at will.

The object of the invention is to provide an automatic trip arranged to render the positive means, for holding the plow beam in a lowered position, inoperative, when the plow proper strikes a stone, root or other obstruction, and thereby permits the plow beam to lift and the plow proper to move out of the ground and away from the obstruction, thus preventing the plow from being damaged or broken.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a fragmentary side elevation of a sulky plow having the invention incorporated therein;

Fig. 2 is a detail view principally in plan, with some parts sectioned on the line 2—2 of Fig. 1, on an enlarged scale;

Fig. 3 is a detail view principally in side elevation, with some parts sectioned on the line 3—3 of Fig. 2; and Fig. 4 is a detail view, on an enlarged scale, with some parts sectioned, and illustrating the forward end of the plow beam and draft device attached thereto.

Of the parts of the sulky plow illustrated, it is important to note the wheel-supported frame 5, the beam 6 and the plow bottom 7. Tandem U-shaped reversible swinging links 8 suspend the beam 6 from the frame 5 for lowering and forward movement and for raising and backward movement. A heavy coiled spring 9, attached at its forward end to an upwardly projecting post 10 on the plow beam 6 and adjustably connected at its rear end to a post 11 on the frame 5, is under strain to lift the plow beam 6 and move the same rearward.

The plow beam 6 and bottom 7 are lowered and raised by a toggle lever 12—13 and foot levers 14 and 15. The toggle lever member 12 has its outer end pivoted at 16 to the plow beam 6 and the pivotal connection between the members of said lever is indicated by the numeral 17. The outer end of the toggle lever member 13 is rigidly secured to one end of a short horizontal shaft 18, journaled at its intermediate portion in a bearing 19 on the frame 5. To the other end of the shaft 18, is rigidly secured the foot lever 14 which projects upwardly and rearwardly therefrom.

Integrally formed with the toggle lever member 13, is a pair of upwardly projecting and laterally spaced lugs 20, between which is mounted the foot lever 15. This foot lever 15 is pivoted at 21 to the lugs 20 and projects forwardly therefrom. Integrally formed with the pivoted end of the toggle lever member 13, is a finger 22 having mounted therein a set screw 23, arranged to engage the toggle lever member 12 and limit the buckling movement thereof.

The foot lever 14, which is relatively long, is used primarily for lifting the plow beam 6, but it may also be used for controlling the lowering movement of said beam. The foot lever 15, which is relatively short, is used in lowering the plow beam 6 and when thus used, bears against a shoulder 24 on the toggle lever member 13, so that further movement of said lever imparts a like movement to the toggle lever member 13. A spring 25 is under strain to normally lift the foot lever 15 out of engagement with the shoulder 24.

Integrally formed with the pivoted end of the foot lever 15, is a latch hook 26 arranged to yieldingly interlock with a lug 27 on the bearing 19, under the action of the spring 25, when the plow beam 6 is in its uppermost position, and thereby lock the same in said position. Also formed with the bearing 19, is a foot rest 28. To the forward end of the plow beam 6, is rigidly secured a horizontal clevis bar 29 having formed therein a multiplicity of bores 30 transversely spaced, with respect to said plow beam.

From the above description, it is evident that, when the plow beam 6 is in its lowered and foremost position, the toggle lever 12—13 is buckled and the plow beam 6 positively held thereby against lifting and rearward movement. To raise the plow beam 6, and hence, the plow bottom 7, the operator presses down on the foot lever 14, to first straighten the toggle lever and then lift the plow beam 6, with the assistance of the spring 9. At the completion of the lifting movement of the plow beam 6, the latch hook 26 automatically interlocks with the lug 27, and thereby holds the plow beam 6 and bottom 7 against lowering movement.

In lowering the plow beam 6, the operator has both of his feet on the foot levers 14 and 15, and his first action is to press downward on the foot lever 14 sufficiently to relieve the frictional contact between the latch hook 26 and the lug 27. Then by a downward pressure on the foot lever 15, the latch hook 26 is moved out of engagement with the lug 27 and said lever moved into engagement with the shoulder 24. A further movement of the foot lever 15, together with the weight of the plow beam 6 and plow bottom 7, will overcome the spring 9 and lower said beam and bottom. The final movement on the foot lever 15 will buckle the toggle lever 12—13 and thereby lock the plow beam against lifting movement.

The parts thus far described are of standard construction and have been illustrated simply for the purpose of showing the invention in working position.

The purpose of my invention is to automatically straighten the toggle lever 12—13 and release the plow beam 6, when the plow bottom 7 strikes a stone, root, or other obstruction. With the plow beam 6 released, the plow bottom 7 will recede and, at the same time, lift from the obstruction, owing to the link connections 8 between said beam and the frame 5, and under the action of the spring 9. As one means for performing this function, I provide a trip, arranged to be actuated by a draft device, of novel construction, when the plow bottom 7 meets with resistance beyond a predetermined degree.

The trip, as shown, is in the form of a bell-crank 31 pivoted at 32 to the frame 5, with its short arm normally projecting downwardly and forwardly and in engagement with the toggle lever 12—13, at the pivotal connection 17, so that by a forward movement of the long arm of said bellcrank, which projects downwardly, will straighten the toggle lever and render the same inoperative as to holding the plow beam 6 against lifting movement.

The improved draft device comprises a horizontal lever 33, which extends transversely of the plow beam 6 and is pivotally connected to the clevis bar 29 by a pair of vertically spaced links 34. These links 34 are connected to the clevis bar 29 by a nut-equipped bolt 35 passed through alined bores in said links and any one of the bores 30 in the clevis bar. Obviously, by adjusting the links 34 on the clevis bar 29, the side draft on the plow may be offset, at will. The other or movable end of the draft lever 33 is yieldingly connected to the clevis bar 29 by a long nut-equipped eye-bolt 36 and a coiled spring 37. The head of the eye-bolt 36 is bifurcated to receive the clevis bar 29 and is yieldingly attached thereto for horizontal swinging movement by a short nut-equipped bolt 38 passed through one of the bores 30 in said clevis bar.

The body of the bolt 36 works through a long slot 39, formed in the free or movable end of the draft lever 33, and the spring 37 encircles the outer end of said bolt for compression between the nut thereon and the draft lever 33. A long rod 40 adjustably connects the long arm of the trip 31, with the movable end of the draft lever 33. The end of the rod 38, at the draft lever 33, is screw-threaded to receive a nut 41, by which the operative link of said rod may be varied, at will. Intermediately connected to the draft lever 33, is a clevis 42 provided for attaching the plow to a draft equalizer or a tractor.

While the plow bottom is moving through the ground, the spring 37 is of such tension as to be compressed, substantially as shown in Fig. 4, and this tension may be varied, at will, by adjusting the nut on the bolt 36. In case the plow bottom strikes an obstruction, the draft lever 33 will be moved out of its normal position, thereby further compressing the spring 37. This movement of the draft lever 33 will also draw the rod 40 forward and actuate the trip 31. As previously stated, the movement of the trip 31 will straighten the toggle lever 12—13; thus permitting the plow beam 6 to move upwardly and rearwardly and carry the plow bottom therewith to clear the obstruction. After the plow bottom is clear of the obstruction, the same may be again set into the ground by operating the foot lever 15, as previously described.

The expression "straightening the toggle lever" is herein used, in a broad sense, to indicate the position of the toggle lever, when moved from a buckled position to a released position, or, in other words, beyond a dead center.

What I claim is:—

1. A plow having its beam supported for raising and lowering movement, and a toggle lever for raising and lowering the beam, said toggle lever when buckled arranged to hold the beam in its lowered position, in combination with a draft device yieldingly attached to the beam, of a trip for straightening the toggle lever to permit the plow to rise and a connection between the draft device and trip, whereby said trip will be actuated when the plow strikes an obstruction.

2. A plow having its beam supported for raising and lowering movement, and a toggle lever for raising and lowering the beam, said toggle lever when buckled arranged to hold the beam in its lowered position, in combination with a draft device variably and yieldingly attached to the beam, of a trip for straightening the toggle lever to permit the plow to rise, and a connection between the draft device and trip, whereby said trip will be actuated when the plow strikes an obstruction.

3. A plow having its beam supported for raising and lowering movement, and a toggle lever for raising and lowering the beam, said toggle lever when buckled arranged to hold the beam in its lowered position, in combination with a trip for straightening the toggle lever to permit the plow to rise, of a draft device including a lever having one of its ends pivoted to the plow beam and its other end yieldingly connected thereto, and a connection between the movable end of the draft lever and the trip, whereby said trip will be actuated when the plow strikes an obstruction.

4. A plow having its beam supported for raising and lowering movement, and a toggle lever for raising and lowering the beam, said toggle lever when buckled arranged to hold the beam in its lowered position, in combination with a trip for straightening the toggle lever to permit the plow to rise, of a clevis bar on the plow beam, a lever, a link connecting one end of the lever to the clevis bar, a nut-equipped eye-bolt attached to the clevis bar and extended through an aperture in the movable end of the lever, a coiled spring encircling the eye-bolt between its nut and the draft lever, and a connection between the draft lever and trip, whereby said trip will be actuated when the plow strikes an obstruction.

5. A plow having its beam supported for raising and lowering movement, and a toggle lever for raising and lowering the beam, said toggle lever when buckled arranged to hold the beam in its lowered position, in combination with a trip for straightening the toggle lever to permit the plow to rise, of a clevis bar on the plow beam, a lever, a link connecting one end of the lever to the clevis bar, a nut-equipped eye-bolt attached to the clevis bar and extended through an aperture in the movable end of the lever, a coiled spring encircling the eye-bolt between its nut and the draft lever, and an adjustable connection between the draft lever and trip, whereby said trip will be actuated when the plow strikes an obstruction.

In testimony whereof I affix my signature in presence of two witnesses.

JOHN C. DAHL.

Witnesses:
F. L. HILL,
W. H. KINLER.

Copies of this patent may be obtained for five cents each, by addressing the "Commissioner of Patents, Washington, D. C."